(12) United States Patent
Ogawa

(10) Patent No.: US 6,800,969 B2
(45) Date of Patent: Oct. 5, 2004

(54) STEPPING MOTOR

(75) Inventor: Yoshinori Ogawa, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 10/310,467

(22) Filed: Dec. 5, 2002

(65) Prior Publication Data

US 2004/0007924 A1 Jan. 15, 2004

(30) Foreign Application Priority Data

Dec. 6, 2001 (JP) ........................................ 2001-372204

(51) Int. Cl.[7] ............................................... H02K 5/16
(52) U.S. Cl. ..................................... 310/49 R; 310/90
(58) Field of Search ................................. 310/90, 49 R

(56) References Cited

U.S. PATENT DOCUMENTS 4,559,461 A  * 12/1985 Takahashi et al. ........ 310/49 R

FOREIGN PATENT DOCUMENTS

JP  05-153761  6/1993
JP  11-252890  9/1999

* cited by examiner

*Primary Examiner*—Thanh Lam
(74) *Attorney, Agent, or Firm*—Reed Smith LLP

(57) ABSTRACT

A stepping motor includes a pair of drive coils arranged to sandwich a magnetic rotor in the axial direction of a rotor shaft in order to decrease the motor size. The drive coils are configured to be annular around the rotor shaft that extends in both directions from the magnetic rotor. A pair of cylindrical yokes are provided to enclose the drive coils. A pair of sintered bearings that support the rotational movement of the rotor shaft are made of a magnetic material, and the cylindrical yokes and the sintered bearings are formed together.

9 Claims, 4 Drawing Sheets

STEPPING MOTOR

TECHNICAL FIELD OF THE INVENTION

The present invention relates to a stepping motor, which uses a permanent magnet as a rotor.

BACKGROUND OF THE INVENTION

As illustrated in FIG. 5, a basic stepping motor 100 is configured such that a rotor 101 composed of a permanent magnet and stator 102a, 102b is arranged around an outer circumference of the rotor 101; the rotor 101 is rotatably supported by bearing 104 via a rotor shaft 101a.

The stator 102a, 102b has stator yoke 103a, 103b which has claw-pole-type pole teeth, and drive coil 109 stored inside the stator yoke 103a, 103b.

More specifically described, the stator yoke 103a, 103b consists of an inner yoke 106 and an outer yoke. The inner yoke 106 has a plurality of pole teeth, which are bent at a right angle at ring-like flange portion 105. Note that the outer yoke has the same structure as that of the inner yoke, and its description is omitted.

Then, the inner yoke 106 and the outer yoke are arranged such that the pole teeth thereof are alternately arranged between the pole teeth of the other. The drive coil 109 is stored in a space created between the stator yoke 103a (103b) and a case 110. Note that the stator yoke 103a, 103b is generally formed as a member separate from the bearing 104.

Since the rotor 101 is placed on the inner side of the coil 109, the inner diameter of the coil 109 cannot be smaller than the outer diameter of the rotor 101. Thus, this prevents having a smaller configuration.

As a stepping motor 200 illustrated in FIG. 6, a motor to be used in a camera is configured such that stators 201a and 201b are arranged in the axial direction sandwiching a rotor 202 therebetween. Thus, the configuration of this type of motor is smaller in size than that of the above mentioned basic stepping motor, and also a large outer diameter can be given to the rotor 202, which is a benefit to the output.

In other words, stator yoke 208a, 208b is configured in the following manner: an outer yoke 204, which has a comb-like outer side, and an inner yoke 207 having a comb-like shaped larger diameter portion 205, which has the same diameter as that of the outer yoke 204, and a smaller diameter portion 206 are put together, and these are provided in pairs; the comb-like portion of the outer yoke 204 and the comb-like portion of the inner yoke 207 are arranged alternately adjacent to each other around a circumference; and the outer yoke 204 and the smaller diameter portion 206 of the inner yoke are opposite to each other in the radial direction. With this, the coil 209 and the rotor 202 can be arranged so as not to overlap with each other in the radial direction. This makes the outer diameter of the motor small.

With the configuration illustrated in FIG. 6, however, pressing of the stator yoke 208a, 208 is very difficult and therefore it is difficult to obtain a consistent shape. Also, a magnetic flux concentrates and saturates at the inner yoke smaller diameter portion 206 around a rotor shaft 210 because the rotor shaft 210 has a small cross-section. This causes a magnetic flux distribution having an area that does not contribute to the torque, and a generated magnetomotive force is consumed in this area. Thus, the performance cannot be improved. The area that does not contribute to torque may be made thicker than other areas to enlarge the cross-section thereof in order to improve efficiency of the motor. However, it is not easy to form that area such that it is large by pressing.

SUMMARY OF THE INVENTION

Thus, an objective of the present invention is that, by using a sintered material for a center portion through which a rotor shaft passes, the thickness of a pole core (a cross-section of the stator yoke) can be freely adjusted to prevent the eddy-current loss that is caused by magnetic saturation during high speed rotation, in order to improve motor properties. The sintered material used for the center portion also has a bearing function in order to reduce the number of components. Also, the concentric positioning of the pole cores may be facilitated in order to improve operability.

To achieve the above objective, the present invention provides a stepping motor in which a pair of drive coils are arranged in the axial direction to sandwich a magnetic rotor, wherein the drive coils are configured to be annular having a rotor shaft as a center, the rotor shaft extending from the magnetic rotor in the both directions, a pair of cylindrical yokes are provided to enclose the drive coils, a pair of sintered bearings that support the movement of the rotor shaft are made of a magnetic material, and the cylindrical yokes and the sintered bearings are integrally formed.

Each of the sintered bearing is of a cylindrical shape with an inner wall in the center that the rotor shaft moves with respect to, and is positioned between an inner wall of the drive coil and the rotor shaft. Also, each of the sintered bearing is configured such that the cylindrical end portion thereof located at the outer end of the drive coil is enlarged to form a disk-like flange that is a portion of the stator yoke, together with the cylindrical portion.

In another aspect of the invention, a stepping motor comprises a rotor shaft, a magnetic rotor fixedly disposed around the rotor shaft, a pair of drive coils disposed annularly with the rotor shaft and disposed to sandwich the magnetic rotor in the axial direction of the rotor shaft, a pair of cylindrical yokes surrounding the pair of drive coils, and a pair of sintered bearings made of magnetic materials and supporting the rotational movement of the rotor shaft.

In another aspect of the invention, a stepping motor comprises a rotor shaft, a rotor having a permanent magnet and being disposed around the rotor shaft, stators disposed to sandwich the rotor in the axial direction of the rotor shaft and surround drive coils, and bearings rotatably supporting the rotor. A portion of the stators arranged to surround the drive coils are made of a sintered magnetic material.

DETAILED DESCRIPTION OF THE INVENTION

Figure 1A:
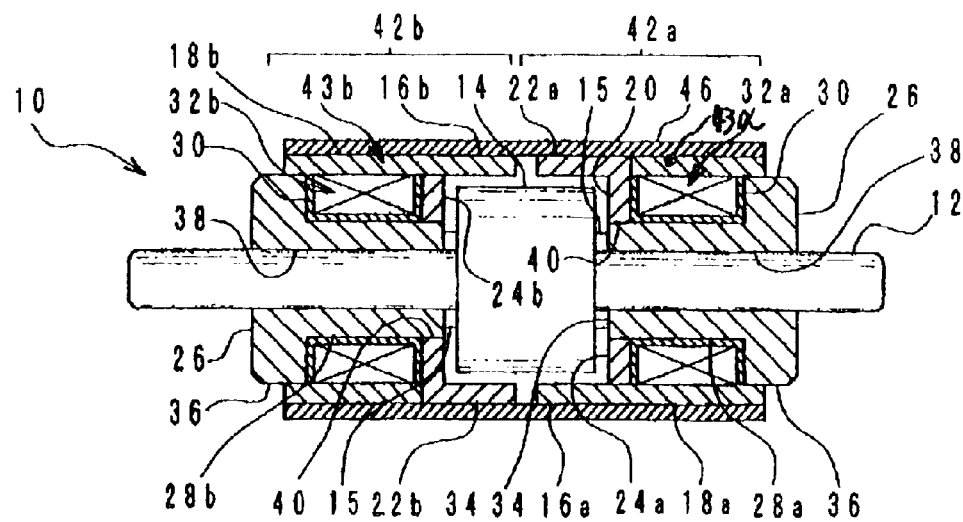
FIG. 1 is an axial cross-sectional view of a first embodiment of a stepping motor of the present invention.
Figure 1B:
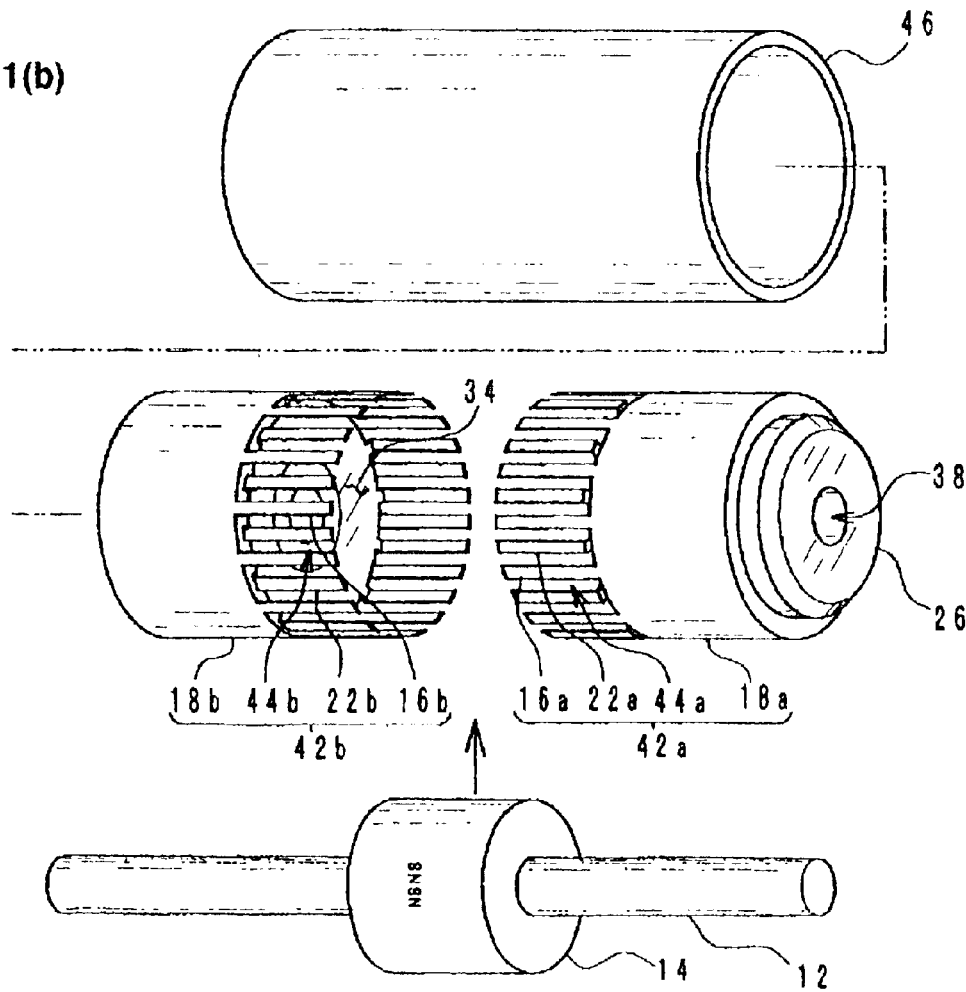

Embodiments of the stepping motor of the present invention are described hereinafter based on the drawings. In a first embodiment of the stepping motor of the present invention, as illustrated in an axial cross-sectional view in FIG. 1(a) and in a disassembly diagram in FIG. 1(b), a stepping motor 10 is configured such that a magnetic rotor 14, a pair of cylindrical outer yokes 18a and 18b, and a pair of inner yokes 28a and 28b create two ring-like spaces, and exciting coils 32a and 32b whose outer peripheries are protected by an insulation material 30 are stored in the spaces. The rotor magnet 14 which is multipolar magnetized is arranged around the outer circumference of a rotor shaft 12. The outer yoke 18a, 18b has a plurality of comb-like pole teeth 16a, 16b on one side in the axial direction. The inner yoke 28a, 28b is composed of bearing 26, which is connected to pole teeth core 24a, 24b having a plurality of comb-like pole teeth 22a, 22b on the same circumference as the pole teeth 16a, 16b of the outer yoke 18a, 18b, the pole teeth 22a, 22b being bent perpendicularly at a ring-like flange portion 20.

Each bearing 26 for rotatably supporting the rotor shaft 12 at both sides of the rotor 14 is made of a sintered iron alloy and consists of a sleeve 34 and a flange portion 36, and a through hole 38 is formed in the center in which the rotor shaft 12 is inserted and rotatably supported. Each bearing 26 is configured in the following manner: the exciting coil 32a, 32b is first fitted to the outer side of the sleeve 34; the inner circumference of a center hole 40 of the flange portion 20 is connected with the outer end of the coil 32a, 32b; the end of the outer yoke 18a, 18b is connected with the outer circumference of the flange 36; and the connecting portions are bonded or welded by a publicly-known proper means to construct stator 42a, 42b. Since the pole teeth core 24a, 24b and the outer yoke 18a, 18b are fitted to the outer circumference using the bearing 26 as a center core, their coaxial positioning can be easily adjusted.

The stator yoke 43a, 43b surrounds the exciting coil 32a, 32b to form a magnetic path, and an annular pole teeth line 44a, 44b, in which the pole teeth 16a, 16b and 22a, 22b of the inner yoke and outer yoke are alternately arranged, generates a magnetic field in an air gap created with the rotor 14. The magnetic outer circumference of the rotor is opposite to the inner circumference of the annular pole teeth line 44a, 44b keeping a small gap therebetween. With this configuration, lubricant oil is in the sintered bearing portion to improve the bearing performance of the bearing portion. Spacers 15 control the axial position of the rotor 14; a resilient material such as a wave washer may be used for one of the spacers 15.

The stator 42a, 42b is configured such that the inner yoke 28a, 28b, which is made of a sintered iron alloy and has the sleeve 34 that forms the bearing 26, is given a sufficient thickness, with which magnetic saturation is not caused, and is inserted inside the inner circumference of the exciting coil 32a, 32b; the stator 42a, 42b also comprises the outer yoke 18a, 18b, which is of a larger diameter, having the annular pole teeth line 44a, 44b opposite to the outer circumference of the magnetic rotor 14, and the pole teeth core 24a, 24b; and the stators are arranged on both sides of the rotor in the axial direction such that the exciting coils 32a and 32b do not overlap with the magnetic rotor 14 in the circumferencial direction. A pair of the stators 42a and 42b are fitted to a nonmagnetic cylindrical case 46 having an inner diameter that fits over the outer circumference of the stators 42a and 42b.

The nonmagnetic cylindrical case 46 reduces a leakage of the magnetic flux and also positions a pair of the opposing stators 42a and 42b to obtain an accurate fixing position and an accurate co-axial positioning between the rotor and the bearings. With the improvement of the accuracy in the co-axial adjustment of the annular pole teeth lines 44a and 44b with respect to the rotor, vibration and noise can be reduced and the gap between the rotor outer circumference and the pole teeth can be greatly reduced, thus improving torque properties.

Figure 2:
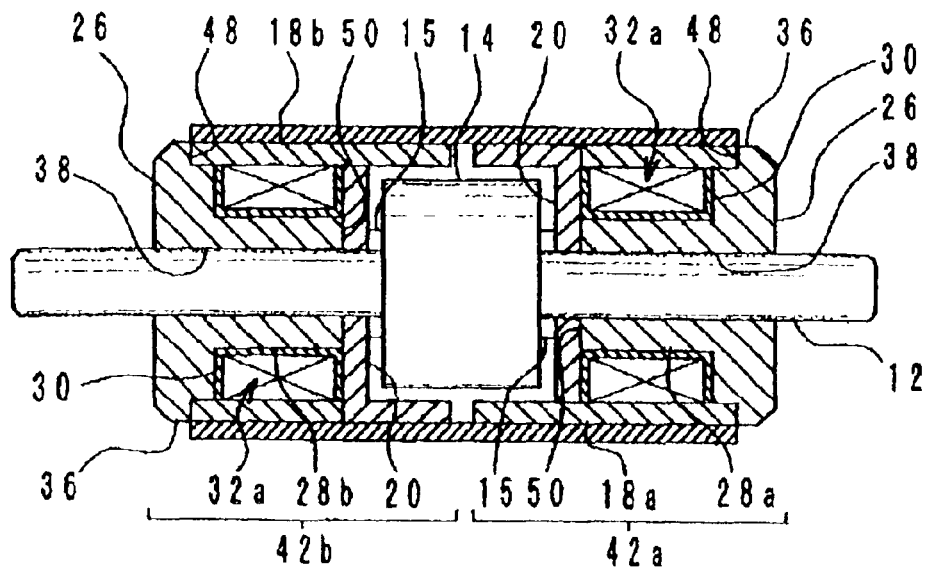
FIG. 2 is an axial cross-sectional view of a second embodiment of the stepping motor of the present invention.

FIG. 2 illustrates an axial cross-sectional view of a second embodiment of the stepping motor of the present invention. The same reference numbers are used for the common members as those in the first embodiment, and their descriptions are omitted. In the second embodiment, a step portion is provided outside the flange 36 so that the outer end surface of the outer yoke 18a, 18b is made to have contact with a step creating surface 48 to define the position of the outer yoke 18a, 18b with respect to the bearing 26. The axial positioning of the inner yoke 28a, 28b is determined by bringing the end surface 50 of the sleeve 34 to contact with the surface of the flange portion 20 of the pole teeth core 24a, 24b. Thus, a relative and axial positioning between the pole teeth 16a, 16b and 22a, 22b of the outer yoke 18a, 18b and the inner yoke 28a, 28b is stable and consistent. This keeps the products uniform.

Figure 3:
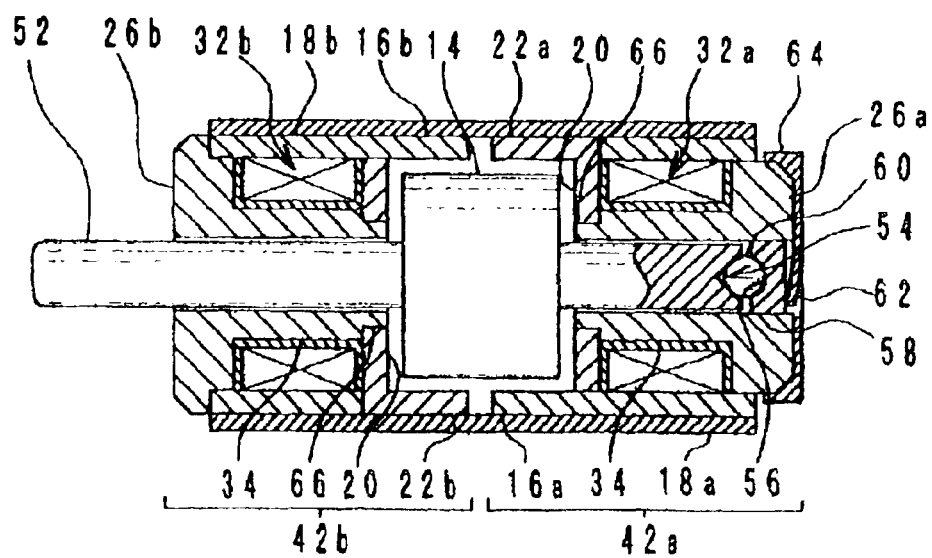
FIG. 3 is an axial cross-sectional view of a third embodiment of the stepping motor of the present invention.

FIG. 3 illustrates an axial cross-sectional view of a third embodiment of the stepping motor of the present invention. The same reference numbers are used for the common members as those in the first and second embodiments, and their descriptions are omitted. In the third embodiment, the rotor shaft is not supported by the sintered sleeve, but rather a bearing is provided externally to support high-speed rotation. The reference numbers 26a, 26b in the third embodiment is given to a sintered yoke that is made of a magnetic material. The sintered yokes 26a, 26b do not have a bearing function, but do function as a connection between the outer yoke 18a, 18b and the inner yoke 28a, 28b to prevent magnetic saturation; they are made of a sintered magnetic alloy and can obtain a sufficient thickness to easily create a magnetic path. With this, the cross-section of the yoke at the area with a concentration of magnetic flux can be large, obtaining more flow of the magnetic flux. Also, there is no need of pressing (such as drawing), and a more uniform thickness can be obtained.

A stainless material, which has an effect to prevent the eddy-current from occurring during high-speed rotation, is used as a raw material of the sintered alloy that is used to form the sintered yoke 26a, 26b. A circular conical surface 54 is recessed in one end surface of the rotor shaft 52, and a steel ball 60 is held between the surface 54 and a spherical surface 58 recessed in a thrust bearing 58 to enable automatic centering within an appropriate range so that the thrust of the rotor shaft 52 can be supported. A cover 64 is fixed to the outside surface of the flange 26a. The cover 64 has a flat spring buffer 62 in the center to support the opposite surface of the spherical surface 56, i.e., the thrust bearing 56, with a resilient force. A protrusion portion 66 provided on the inner end surface of the sleeve 34 of the sintered yoke 26 requires a complicated, yet precise mold; however, as it is fitted into the center hole 40 of the pole teeth core 24a, 24b, the positioning of the sintered yoke 26 in the axial and radial directions can be determined and the centering can be easily done.

Figure 4:
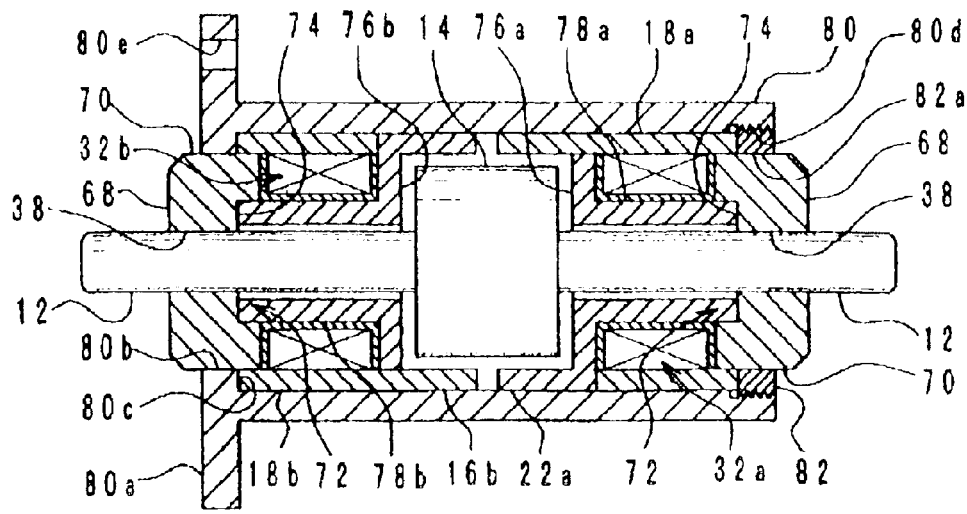
FIG. 4 is an axial cross-sectional view of a fourth embodiment of the stepping motor of the present invention.
Figure 5:
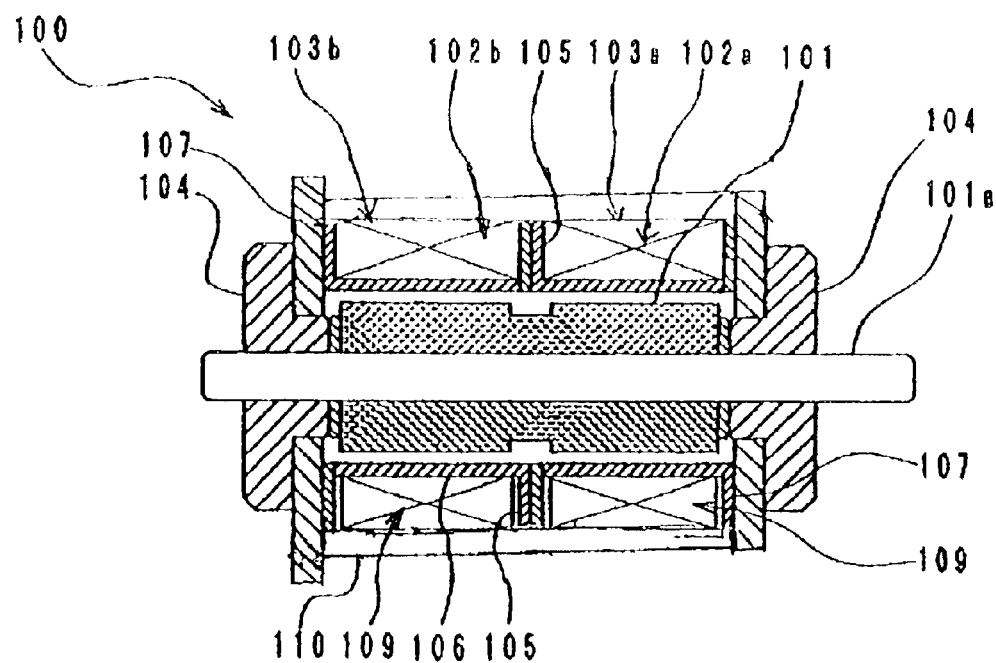
FIG. 5 is an axial cross-sectional view of an embodiment of a conventional stepping motor.
Figure 6:
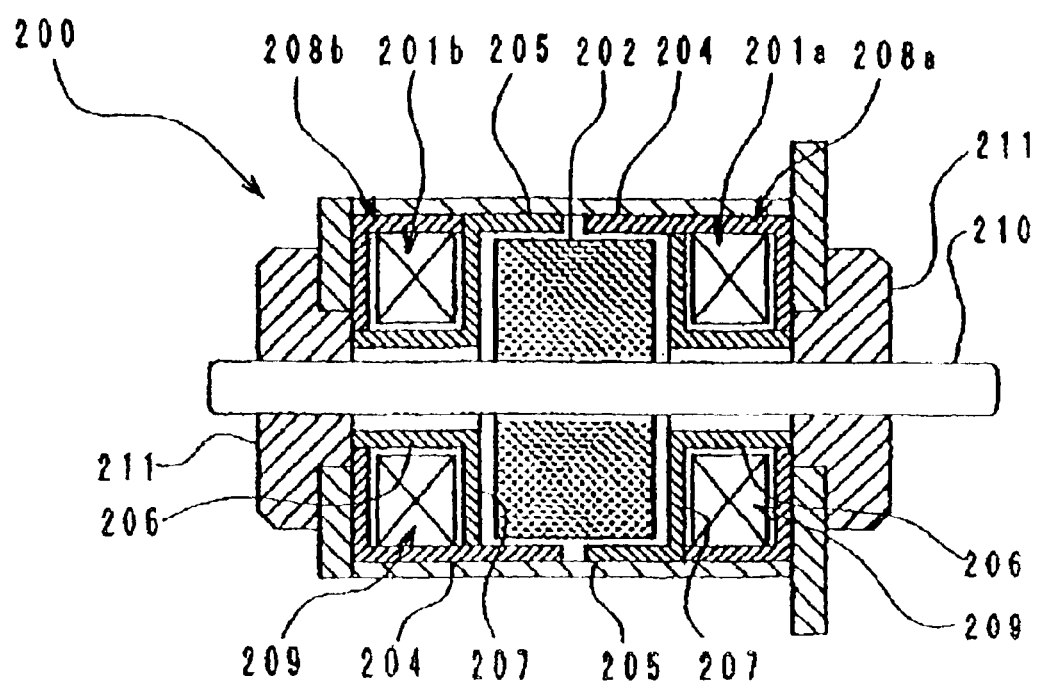
FIG. 6 is an axial cross-sectional view of another embodiment of a conventional stepping motor.

FIG. 4 illustrates an axial cross-sectional view of a fourth embodiment of the stepping motor of the present invention. The same reference numbers are used for the common members as those in the previously described embodiments, and their descriptions are omitted. The fourth embodiment has a configuration of a bearing 68 in which the sleeve 34 having a bearing surface that makes contact with the rotor shaft is eliminated in order to reduce friction. The bearing 68 rotatably supports the rotor shaft 12 in the through hole 38 only with flange 70. In the same manner as in the third embodiment, the flange 70 is formed with sufficient thickness to prevent magnetic saturation and made of a sintered magnetic alloy as a connection portion between the outer yoke 18a, 18b and the inner yoke 28a, 28b to easily obtain a magnetic path. Further, a recess portion 74 is provided to an opening 72 of the through hole 38 on the rotor side, and inner yoke 78a, 78b that is pressed integrally with the pole teeth core 76a, 76b is fitted into and coupled to the recess portion 74.

A cylindrical case 80 is configured such that a fixing flange 80a is extended around the outer circumference on one end and is supported by bringing the outer end of the outer yoke 18b to contact with a closed wall surface 80c thereof that excludes a hole 80b passing over the outer diameter (circumference) of the bearing 68. The inner diameter (circumference) of the cylindrical case 80 is fitted over the outer diameter (circumference) of the outer yoke 18a, 18b, and a female screw is formed in an opening at the other end (on the right side in FIG. 4) and a sealing plate 82 is screwed into this opening.

The sealing plate 82 has a hole 82a into which the outer circumference of the bearing 68 is fitted; therefore, the outer circumference of the sealing plate 82 contacts the outer end of the outer yoke 18a in order to position the stators 42a and 42b inside the cylindrical case 80 and in turn controls the relative movements of the stators in the axial direction. The fixing flange 80a can be connected to an external device with a fixing hole 80e. Since the stepping motor 10 and the cylindrical case 80 are firmly fixed to each other, the positional relationship with an external device (not illustrated) can be precisely, consistently adjusted. Although the sealing plate 82 is provided with a male screw around the outer circumference thereof to be screwed into the female screw in the inner circumference at the open end of the cylindrical case, other engaging means can also be used.

As described above, one embodiment of the present invention is a stepping motor that has a pair of drive coils arranged in the axial direction sandwiching a magnetic rotor therebetween, wherein the drive coils are configured to be annular having a rotor shaft in the center, the rotor shaft extending from the magnetic rotor in both directions; a pair of cylindrical yokes are provided to surround the drive coils; a pair of sintered bearings to support the movement of the rotor shaft are made of a magnetic material; the cylindrical yokes and the bearings are put together to form the stator yokes. Thus, the sintered components are used for the central members in order to freely adjust the thickness of the pole teeth cores (the cross section of the stator yoke) that are portions of the yokes.

Since there is no pressing (such as drawing), it is easy to form the core with a more uniform thickness. Moreover, since the portion wherein the magnetic flux is concentrated can be made thick, more flow of the magnetic flux can be smoothly obtained, improving motor properties. Also, the sintered material is composed of a mass of particles; therefore, a core loss can be reduced. A stainless material also has an effect of reducing the eddy-current loss that is caused during high-speed rotation. Thus, a motor with high efficiency can be provided.

According to the stepping motor described above, each of the sintered bearings is of cylindrical shape having an inner wall in the center thereof with respect to which the rotor shaft moves, and is arranged between the inner wall of the drive coil and the rotor shaft. Thus, the sintered bearings are used as the yokes between the drive coils and the rotor shaft, to which the magnetic flux tends to concentrate; therefore, the thickness of the yoke can be easily ensured and in turn a smooth flow of the magnetic flux can be obtained. Also, the sintered portions composed of a mass of particles can reduce the eddy-current loss.

Each of the sintered bearings described above is configured such that the cylindrical end portion positioned on the outer end of the drive coil is enlarged to form a disk-like flange that, together with the cylindrical portion, becomes a part of the stator yoke. Therefore, the bearing function is given to the central members to simplify the shape of the yoke and to reduce the number of components. This improves operability, making it possible to manufacture a small stepping motor with high performance at low cost.

The cylindrical yokes described above are respectively made to have contact with and fixed to the sintered bearings in the radial direction. Consequently the co-axial positioning and centering of the cores can be easily done, thus improving assembly operations. Also, oil is impregnated in the bearings to increase durability against rust.

According to another embodiment of the present invention, a stepping motor comprises a rotor composed of a permanent magnet, stators which sandwich the rotor in the axial direction and surround the drive coils, and bearings for rotatably supporting the rotor; wherein portions of the yokes arranged to surround the drive coils are made of a sintered magnetic material or alloy to give a large (thick) cross-section to the portions of the yokes wherein the magnetic flux is concentrated. As a result, more flow of the magnetic flux can be obtained. Also, there is no pressing (such as drawing) required, and a more uniform thickness can be given to the yoke.

Though the embodiments are described as above, the present invention is not limited to these embodiments illustrated in the figures, but the shape, configuration, etc. can be modified within the scope of the present invention. Accordingly, the scope of the invention is not limited to the foregoing specification, but instead is given by the appended claims along with their full range of equivalents.

What is claimed is:

1. A stepping motor comprising:
   a pair of drive coils that sandwich a magnetic rotor therebetween in the axial direction, wherein said drive coils are configured to be annular with a rotor shaft in the center, said rotor shaft extending from said magnetic rotor in both directions;
   a pair of cylindrical yokes arranged to surround said drive coils, said cylindrical yokes having a plurality of pole teeth that extend in the axial direction of said rotor shaft;
   a pair of sintered bearings to support the movement of said rotor shaft and made of a magnetic material; and
   wherein said cylindrical yokes and said sintered bearings are formed together.

2. The stepping motor as set forth in claim 1, wherein each of said sintered bearings is of a cylindrical shape having an inner wall in the center thereof to move with respect to said rotor shaft and arranged between an inner wall of said drive coil and said rotor shaft.

3. The stepping motor as set forth in claim 2, wherein said cylindrical sintered bearings are configured such that said cylindrical end portions located at outer ends of said drive coils are enlarged to form disk-like flanges that, together with cylindrical portions, become portions of stator yokes.

4. The stepping motor as set forth in claim 1, wherein said cylindrical yokes are made to have contact with and fixed to said sintered bearings in the radial direction.

5. A stepping motor comprising:

a rotor shaft;

a magnetic rotor fixedly disposed around the rotor shaft;

a pair of drive coils disposed annularly with the rotor shaft and disposed to sandwich the magnetic rotor in the axial direction of the rotor shaft;

a pair of cylindrical yokes surrounding the pair of drive coils, the cylindrical yokes having a plurality of pole teeth that extend in the axial direction of the rotor shaft; and a pair of sintered bearings made of magnetic materials and supporting the rotational movement of the rotor shaft.

6. The stepping motor according to claim 5, wherein the pair of sintered bearings are integrally formed with the pair of cylindrical yokes.

7. The stepping motor according to claim 5, wherein each of the sintered bearings is of a cylindrical shape having an inner wall surrounding the rotor shaft and the each sintered bearing is disposed between an inner wall of the drive coil and the rotor shaft.

8. The stepping motor according to claim 7, wherein each sintered bearing includes a cylindrical portion and a cylindrical end portion attached to the cylindrical portion and located at an outer end of a respective drive coil, the cylindrical end portion being enlarged to form disk-like flanges that, together with the cylindrical portion, become a part of a stator yoke.

9. The stepping motor according to claim 6, wherein the pair of cylindrical yokes contact with and are fixed to the pair of sintered bearings in the radial direction.

* * * * *